No. 779,078. PATENTED JAN. 3, 1905.
J. E. GOODHUE.
CORN HARVESTER.
APPLICATION FILED JAN. 2, 1904.
3 SHEETS—SHEET 2.
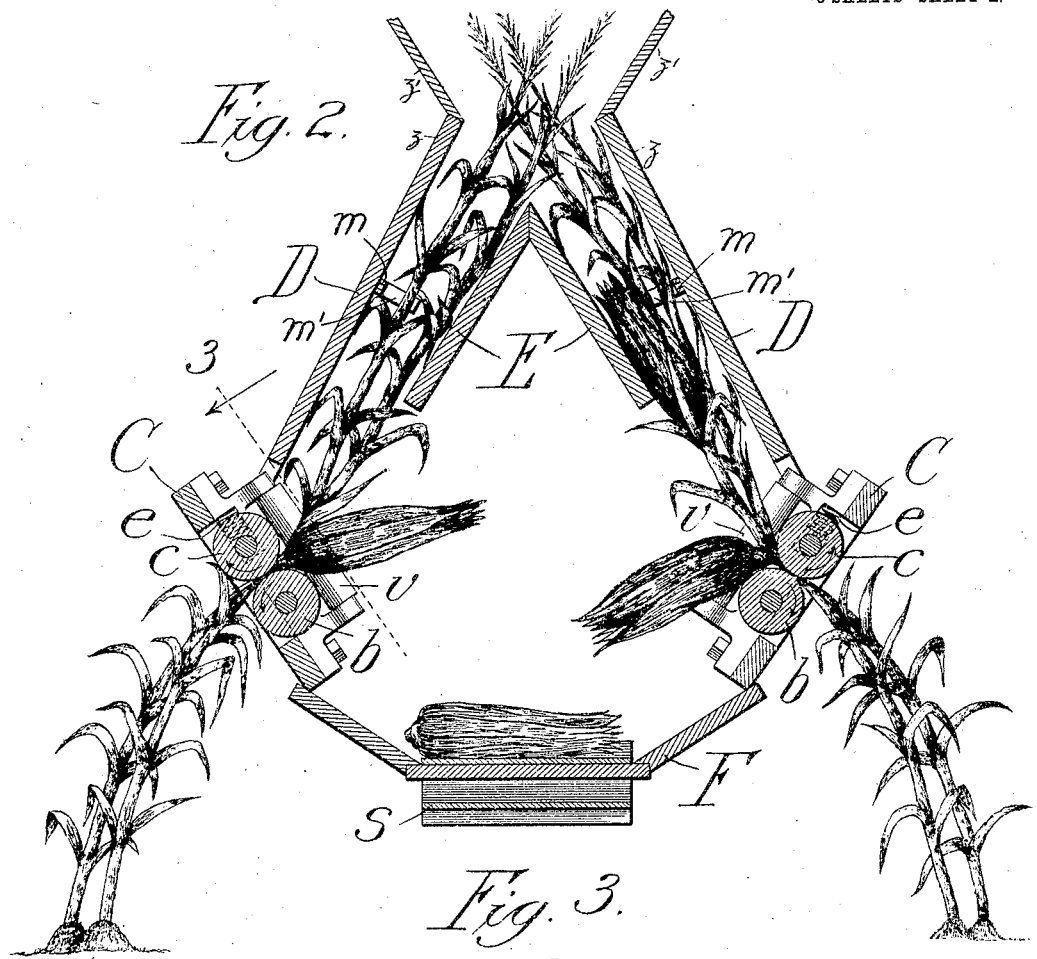
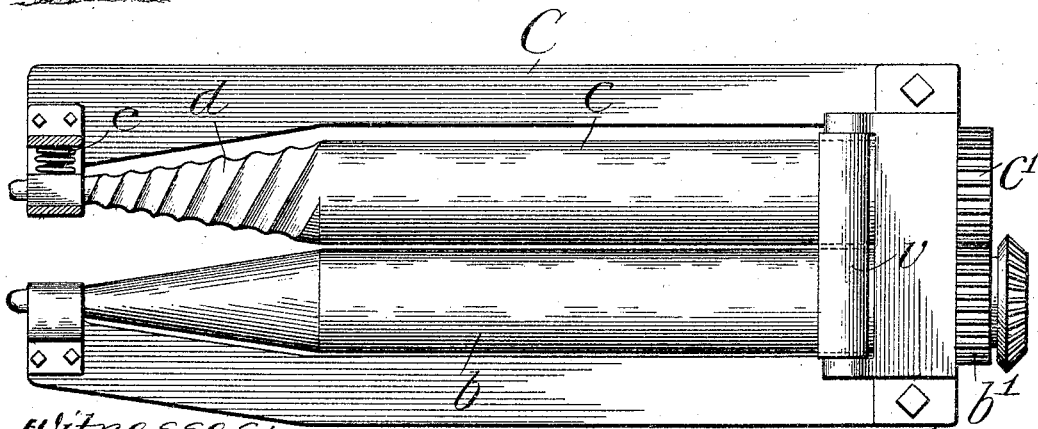
Witnesses:
Inventor:
James E. Goodhue,
By Dyrenforth, Dyrenforth and Lee,
Att'ys

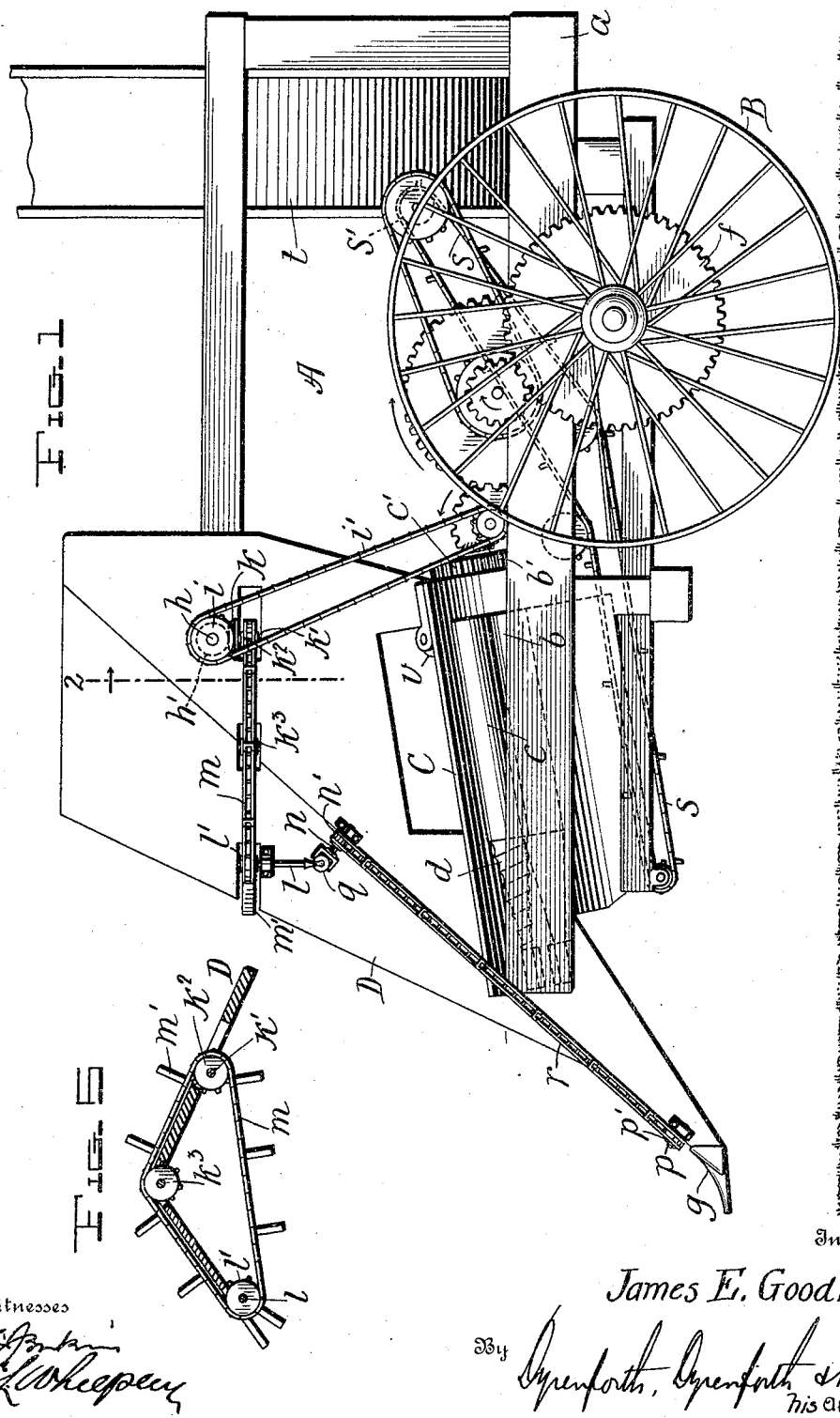

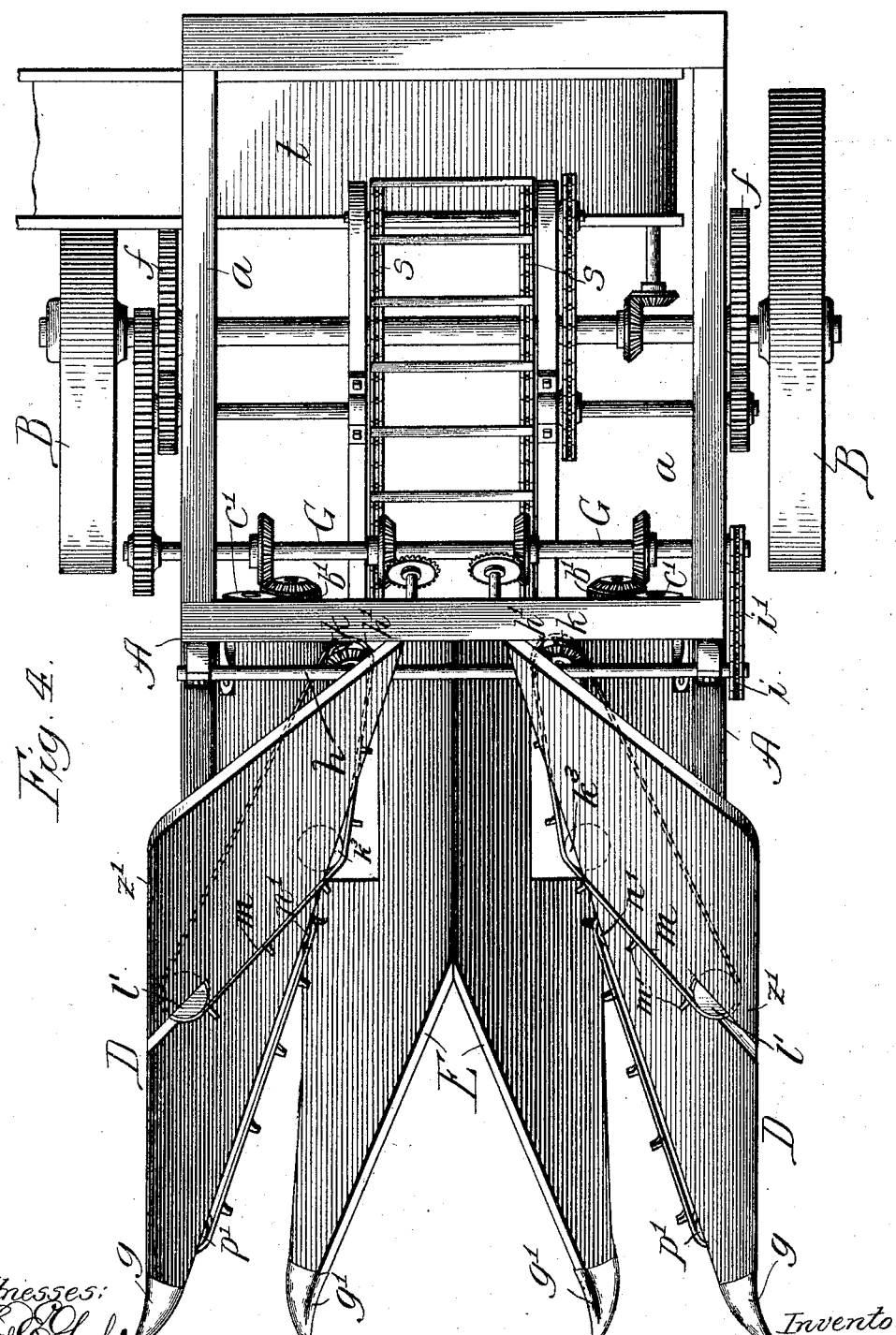

No. 779,078.                                    Patented January 3, 1905.

UNITED STATES PATENT OFFICE.

JAMES E. GOODHUE, OF ST. CHARLES, ILLINOIS.

CORN-HARVESTER.

SPECIFICATION forming part of Letters Patent No. 779,078, dated January 3, 1905.

Application filed January 2, 1904. Serial No. 187,451.

*To all whom it may concern:*

Be it known that I, JAMES E. GOODHUE, a citizen of the United States, residing at St. Charles, in the county of Kane and State of Illinois, have invented a new and useful Improvement in Corn-Harvesters, of which the following is a specification.

My invention relates to improvements in machines for gathering the ears of corn from standing plants in the field.

My object is to provide a machine for the above purpose of simple and improved construction, adapting it to readily engage and snap off the ears without danger of missing or losing any thereof and adapting it, furthermore, to operate upon two rows of standing corn at once.

In the drawings, Figure 1 is a broken side elevation of a corn-harvester or ear-gathering machine constructed with my improvements; Fig. 2, an enlarged cross-section taken on line 2 in Fig. 1, showing only certain parts and the manner in which the snapping-rollers operate to gather and deposit the ears in the machine; Fig. 3, a still further enlarged view taken on line 3 in Fig. 2, and Fig. 4 a broken top plan view of the machine. Fig. 5 is a detail view of the chain $m$.

A is the frame of the machine, which is mounted upon wheels B far enough apart to travel at the outer sides of two adjacent rows of standing corn in the field. Fastened to longitudinally-extending side bars $a$, forming part of the main frame, are frames C, inclined, as shown in Fig. 2, and forming synclinally-disposed supports for inner and outer snapping-rollers $b$ $c$, respectively, tapering along their forward end portions in a common manner. The tapering portions $d$ of the outer snapping-rollers are formed with spirals, as shown, and the journals at the opposite ends of the rollers $c$ are in sliding bearings pressed in the directions of the bearings of the rollers $b$ by springs $e$. The synclinally-disposed frames C are preferably at an angle of about sixty degrees from the horizontal plane, causing the rollers of each pair to extend with relation to each other at about the angle named, the outer rollers being the higher and the pairs to be synclinally disposed with relation to each other. At their rear ends the rollers $b$ $c$ carry intermeshing gear-wheels $b'$ $c'$, the wheels $b'$ being driven through suitable gearing from gears $f$ on the wheels B.

At the outer forward end portions of the frame A are deflector-wings D, constructed with inwardly-inclined boards $z$ and flaring boards $z'$ and provided at their lower ends with pick-up shoes or points $g$ for down corn.

E E are inner deflector-wings parallel with the boards $z$ of the wings D, but coming together at the top, as shown in Fig. 2. The inner deflector-wings E carry pick-ups $g'$, and the wings at each side flare toward the front, as is usual in machines of this class, to guide standing corn into the flaring mouth of the snapping-rollers $b$ $c$ at each side.

On each outer deflecting-wing D, near the top, is a short shaft $h$, carrying a sprocket-wheel $i$, driven by a chain $i'$ from the shaft G, which drives the snapping-rollers at that side. The shaft $h$ carries a miter-gear $h'$, meshing with a miter-gear $k$ on a short shaft $k'$, carrying a sprocket-wheel $k^2$. The sprocket-wheel $k^2$ extends through the board or wing D and projects past opposite sides of the latter. A short shaft $l$ on the outer side of each wing or board D carries a sprocket-wheel $l'$, also extending past opposite sides of the board.

Mounted on each pair of sprocket-wheels $l'$ $k^2$ is a conveyer-chain $m$ of the usual type employed in harvesters and having outward-extending fingers $m'$. The chain $m$ intermediate of its inner traverse passes around an idler sprocket-wheel $k^3$. The chains $m$ travel on the inner and outer sides of the wings D in the backward direction on the inner sides.

Journaled on the outer sides of the wing-boards D, below the shafts $l$, are inclined shafts $n$, carrying sprocket-wheels $n'$, extending past opposite sides of the boards, and near the lower ends of the boards are short shafts $p$ parallel with the shafts $n$ and carrying sprocket-wheels $p'$, extending beyond opposite surfaces of the boards. The shafts $l$ $n$ at each side are coupled together by a universal joint $q$, and a conveyer-chain $r$, like the chain $m$ at each side of the machine, extends over the sprockets $n'$ $p'$ and runs along opposite sides of the wing or board D. The gearing that I prefer to provide is such that the chains $r$ move at their inner stretches in the backward direction at a speed approximating that of the forward travel of the machine, while the chains $m$ travel at their inner stretches in the backward direction at a much greater rate of speed.

Mounted between the side rails $a$, just below the frames C, is a trough F, extending substantially the full length of the frames C. On the trough is a conveyer-belt $s$, movable at its upper stretch in the base of the trough and in the backward direction. The belt extends over a pulley $s'$ toward the rear of the machine and discharges into an elevator $t$ of a usual type extending upward and laterally from the machine.

The flaring ends of each pair of wings D E at the points $g$ $g'$ are far enough apart to move along opposite sides at each side of the machine of a row of standing corn, and incidentally they will raise to a more or less vertical position any corn that is down. The wings of each pair converge to the flaring spaces between the points of the snapping-rollers, as is common in machines of this class; but in the present machine the wings also extend at angles to the direction of forward travel of the machine, which causes them after engaging stalks to bend the stalks along their upper end portions toward the center line of the machine. Thus when engaged by the snapping-rollers the stalks extend as shown in Fig. 2.

In operation, as before stated, the initial stalk engaging and guiding conveyer-chains $r$ move in the backward direction at a speed which causes them to rise along the stalks without bending them in the backward direction. The conveyer-chains $m$, however, which engage the stalks at about the same time that they are engaged by the snapping-rollers, move the upper ends of the stalks rapidly in the backward direction. The snapping-rollers tend to move the stalks downward very rapidly and snap off the ears of corn. Owing to the angle to the horizontal plane of the pairs of snapping-rollers, the ears extend over the trough F when they are snapped off and fall into the latter upon the conveyer-belt $s$. The ears cannot lie upon the rollers, but must drop therefrom by gravity, and are thus prevented from clogging the rollers.

Above the rear ends of the snapping-rollers $b$ $c$ are transversely-extending stops, preferably in the form of rollers $v$, journaled in bearings on the frames C, which stop the backward travel of the stalks through the rollers and make it necessary for the upper parts of the stalks to pass downward between the snapping-rollers in the travel of the machine. Thus ears will be engaged and snapped off by the machine, no matter how high they may be from the ground. By causing the chains $r$ $m$ to move in the backward direction at different speeds, as described, the stalks when engaged by the snapping-rollers are moved with sufficient rapidity in the backward direction to carry them along the snapping-rollers in a manner to prevent their interfering with the next incoming stalks, thereby preventing clogging of the machine. The relative angles of the pairs of snapping-rollers at each side insure the proper deposit of the snapped-off ears in a comparatively narrow trough, as is required in a machine of the necessary limited width.

While I prefer to construct the machine throughout as shown and described, variations in the matter of details may be made without departing from the spirit of the invention as defined by the claims.

What I claim as new, and desire to secure by Letters Patent, is—

1. In a corn-harvester of the character described, a pair of snapping-rollers, one at a higher level than the other to extend with their respective axes on an inclined plane, and stalk-engaging means in front of said rollers operating to bend the stalks laterally and guide them into the bite of the rollers at the forward ends thereof, substantially as and for the purpose set forth.

2. In a corn-harvester of the character described, the combination with the main frame and running-gear, of pairs of coöperating snapping-rollers respectively at opposite side portions of the frame, with actuating means therefor, the said pairs being synclinally disposed with relation to each other, and stalk-engaging means in front of each said pair of rollers operating to bend the stalks inwardly toward the longitudinal center of the machine and guide them into the bites of the said rollers, substantially as and for the purpose set forth.

3. In a corn-harvester of the character described, the combination with the main frame and running-gear, of pairs of coöperating snapping-rollers respectively at opposite side portions of the frame, with actuating means therefor, the said pairs being synclinally disposed with relation to each other, stalk-engaging means in front of each said pair of rollers operating to bend the stalks inwardly toward the longitudinal center of the machine and guide them into the bites of the said rollers, and an ear-receiving receptacle between the said pairs of rollers, substantially as and for the purpose set forth.

4. In a corn-harvester of the character described, the combination with the main frame and running-gear, of pairs of coöperating snapping-rollers respectively at opposite side portions of the frame, with actuating means therefor, the said pairs being synclinally disposed with relation to each other, stalk-engaging means in front of each said pair of rollers operating to bend the stalks inwardly toward the longitudinal center of the machine and guide them into the bites of the said rollers, and a backwardly-moving ear-receiving conveyer between the said pairs of snapping-rollers, substantially as and for the purpose set forth.

5. In a corn-harvester of the character described, the combination with the main frame and running-gear, of pairs of coöperating snapping-rollers respectively at opposite side portions of the frame, with actuating means therefor, the said pairs being synclinally disposed with relation to each other, stalk-engaging means in front of each said pair of rollers operating to bend the stalks inwardly toward the longitudinal center of the machine and guide them into the bites of the said rollers, a backwardly-moving ear-receiving conveyer between the said pairs, and an upward and laterally extending ear-discharging elevator into which the said conveyer discharges, substantially as and for the purpose set forth.

JAMES E. GOODHUE.

In presence of—
  WALTER N. WINBERG,
  JOHN H. LEE.